(12) United States Patent
Brickner et al.

(10) Patent No.: US 10,131,035 B1
(45) Date of Patent: Nov. 20, 2018

(54) SURFACE FINISHING

(71) Applicant: Apple Inc., Cupertino, CA (US)

(72) Inventors: Michael T. Brickner, Cupertino, CA (US); Ian Davison, Cupertino, CA (US); Wayne Cowan, Cupertino, CA (US); Naiming Fu, Cupertino, CA (US)

(73) Assignee: APPLE INC., Cupertino, CA (US)

( * ) Notice: Subject to any disclaimer, the term of this patent is extended or adjusted under 35 U.S.C. 154(b) by 817 days.

(21) Appl. No.: 14/531,221

(22) Filed: Nov. 3, 2014

Related U.S. Application Data (60) Provisional application No. 62/056,461, filed on Sep. 26, 2014.

(51) Int. Cl.
| | |
|---|---|
| *B32B 3/00* | (2006.01) |
| *B32B 3/26* | (2006.01) |
| *B32B 3/30* | (2006.01) |
| *B24C 1/08* | (2006.01) |
| *B24C 1/00* | (2006.01) |
| *B24C 11/00* | (2006.01) |
| *B44C 1/22* | (2006.01) |
| *C23F 1/02* | (2006.01) |

(52) U.S. Cl.
CPC ............... *B24C 1/08* (2013.01); *B24C 1/006* (2013.01); *B24C 11/00* (2013.01); *B32B 3/00* (2013.01);
(Continued)

(58) Field of Classification Search
CPC .... B23K 26/00; B23K 26/0066; B23K 26/36; B23K 26/0069; B23K 26/0072; B23K 26/362; B23K 26/0075; B23K 26/0078; B23K 26/0084; B23K 26/364; B44C 3/00; B44C 3/005; B44C 1/22; B44C 1/221; B44C 1/222; B44C 1/225; B44C 1/227; B44C 1/228; B41M 5/26; B41M 5/262; B44F 1/00; B44F 1/02; B44F 1/08; B44F 1/10; B44F 1/14; G09F 13/16; G02B 6/0038; Y10S 24/00; Y10T 428/265; Y10T 428/266; Y10T 428/12993;
(Continued)

(56) References Cited

U.S. PATENT DOCUMENTS

| | | | |
|---|---|---|---|
| 5,235,169 A | 8/1993 | Wakaumi et al. | |
| 5,635,269 A | 6/1997 | Weir et al. | |

(Continued)

FOREIGN PATENT DOCUMENTS

| | | |
|---|---|---|
| DE | 4106151 | 11/1991 |
| FR | 2975617 | 11/2012 |

(Continued)

*Primary Examiner* — Michael E. La Villa
(74) *Attorney, Agent, or Firm* — Dorsey & Whitney LLP (57) ABSTRACT

Grooves are formed on an exterior surface of a component. The grooves are formed proximate to one another such that the grooves diffract light. The exterior surface is processed to reduce the sharpness of peaks between the grooves, reduce differences between the peaks and valleys of the grooves, and/or roughen the grooves. The processing reduces diffraction caused by the grooves such that light reflected from the grooves is not substantially color-shifted (e.g., is or is near the color of the reflecting surface). In various implementations, the processing may include dry blasting, etching, abrasive blasting, burnishing, grinding, ablation, an/or any other process capable of reducing the sharpness, reducing the differences, and/or roughening the surface. In implementations where dry blasting is used, the dry blasting may use ceramic beads as a blast material.

20 Claims, 9 Drawing Sheets

(52) U.S. Cl.
CPC .............. *B32B 3/26* (2013.01); *B32B 3/30* (2013.01); *B44C 1/227* (2013.01); *C23F 1/02* (2013.01); *Y10S 24/00* (2013.01); *Y10T 428/12736* (2015.01); *Y10T 428/12896* (2015.01); *Y10T 428/12993* (2015.01); *Y10T 428/265* (2015.01); *Y10T 428/266* (2015.01)

(58) Field of Classification Search
CPC ..... Y10T 428/12896; Y10T 428/12736; B32B 3/00; B32B 3/26; B32B 3/30; B32B 2435/00; B32B 2457/10; B32B 2551/00; B32B 2551/08; B24C 1/08; B24C 1/006; B24C 11/00; C23F 1/02
See application file for complete search history.

(56) References Cited

U.S. PATENT DOCUMENTS

| | | | |
|---|---|---|---|
| 5,880,430 A | 3/1999 | Wein | |
| 6,518,544 B2 | 2/2003 | Aberle et al. | |
| 7,815,117 B2 | 10/2010 | Tuschel et al. | |
| 7,875,414 B2 | 1/2011 | Sawada et al. | |
| 7,975,913 B2 | 7/2011 | Kubota et al. | |
| 8,330,122 B2 | 12/2012 | Smith et al. | |
| 8,424,751 B2 | 4/2013 | Liu et al. | |
| 8,534,540 B2 | 9/2013 | Gratton et al. | |
| 8,715,725 B2 | 5/2014 | Stuck et al. | |
| 9,639,224 B2 | 5/2017 | Lee et al. | |
| 9,679,187 B2 | 6/2017 | Bhagavat et al. | |
| 2006/0056028 A1* | 3/2006 | Wildnauer | G02B 5/1809 359/575 |
| 2009/0171654 A1 | 7/2009 | Spain | |
| 2010/0054287 A1 | 3/2010 | Ghauri | |
| 2013/0118048 A1 | 5/2013 | Kawanami | |
| 2013/0341400 A1 | 12/2013 | Lancaster-Larocque | |
| 2014/0061172 A1 | 3/2014 | Kuo | |
| 2014/0338191 A1 | 11/2014 | Petcavich | |
| 2015/0367443 A1 | 12/2015 | Nashner et al. | |

FOREIGN PATENT DOCUMENTS

| | | |
|---|---|---|
| JP | H09296589 | 11/1997 |
| JP | 2001270300 | 10/2001 |

* cited by examiner

SURFACE FINISHING

CROSS-REFERENCE TO RELATED APPLICATION

This application is a nonprovisional patent application of and claims the benefit to U.S. Provisional Patent Application No. 62/056,461, filed Sep. 26, 2014 and titled "Surface Finishing," the disclosure of which is hereby incorporated herein by reference in its entirety.

TECHNICAL FIELD

This disclosure relates generally to finished surfaces, and more specifically to a surface finishing process that reduces or eliminates diffraction caused by grooves in the surface.

BACKGROUND

Surface finishing is a term for a broad range of industrial processes that alter the surface of a manufactured item. Surface finishing of a manufactured item, such as the surface of a metal component, is often performed to achieve particular properties. Such properties may include functional properties such as wettability, solderability, corrosion or tarnish resistance, and so on. Such properties may also include visual properties such as causing a surface to have a particular appearance.

A manufactured item, such as the surface of a metal component, may be finished to achieve a particular appearance by cutting or otherwise forming a number of fine, proximate grooves into the surface utilizing a lathe, router, or other process. However, the proximity of the cut or otherwise formed grooves may diffract white light shone upon the surface. This may result in a rainbow effect caused be the diffracting of the white light into various of the colored light components, altering the appearance of the manufactured item.

SUMMARY

The present disclosure details methods, systems, and apparatuses related to surface finishes. Grooves may be formed on an exterior surface of a component. The grooves may be formed proximate to one another such that the grooves diffract light. The exterior surface may be processed to reduce the sharpness of peaks between the grooves, reduce differences between the peaks and valleys of the grooves, and/or roughen the surface of the grooves. The processing may reduce or eliminate diffraction caused by the grooves such that light reflected from the grooves is not substantially color-shifted (e.g., is or is near the color of the reflecting surface). In this way, the exterior surface may be grooved without causing a rainbow effect.

In various implementations, the processing of the exterior surface may include dry blasting, etching, abrasive blasting, burnishing, grinding, ablation, an/or any other process capable of reducing the sharpness or differences or roughening the exterior surface. In implementations where dry blasting is used, the dry blasting may use ceramic beads (such as zirconia-based materials, materials including silicon, and so on) as a blast material. Such ceramic beads may be a variety of different shapes and sizes (such as between 0 and 65 microns in size, between 5 and 30 microns in size, and so on).

In various embodiments, a method for finishing a surface may include forming grooves on an exterior surface of a component that are proximate to each other such that the grooves diffract light directed at the exterior surface and processing the exterior surface to reduce diffraction caused by the grooves such that light reflected from the grooves shows a color of the exterior surface.

In some embodiments, an apparatus may include a component with an external metal surface. The external surface may include grooves formed between 0.5 microns and 70 microns apart. The grooves may reflect light that shows a color of the exterior surface.

In one or more embodiments, a system for finishing a surface may include a processing unit, a component with an exterior surface including grooves that are proximate to each other such that the grooves diffract light, and computer numeric controller machinery controllable by the processing unit to process the exterior surface of the component to reduce diffraction caused by the grooves. For example, the exterior surface may be processed by reducing sharpness of peaks between the grooves, reducing differences between the peaks and valleys of the grooves, and roughening a surface of the grooves.

It is to be understood that both the foregoing general description and the following detailed description are for purposes of example and explanation and do not necessarily limit the present disclosure. The accompanying drawings, which are incorporated in and constitute a part of the specification, illustrate subject matter of the disclosure. Together, the descriptions and the drawings serve to explain the principles of the disclosure.

DETAILED DESCRIPTION

The description that follows includes sample methods, systems, and apparatuses that embody various elements of the present disclosure. However, it should be understood that the described disclosure may be practiced in a variety of forms in addition to those described herein.

The present disclosure details methods, systems, and apparatuses related to surface finishes. Grooves may be formed (such as by cutting utilizing a machine such as a lathe or router) on an exterior surface of a component (such as an aluminum or other metal component for an electronic device). The grooves may be formed proximate to one another such that the grooves diffract light. The exterior surface may be processed to reduce the sharpness of peaks between the grooves, reduce differences between the peaks and valleys of the grooves, and/or roughen the exterior surface. The processing may reduce or eliminate diffraction caused by the grooves such that light reflected from the grooves is not substantially color-shifted (e.g., is or is near the color of the reflecting surface). In this way, the exterior surface may be grooved without causing a rainbow effect.

In various implementations, the grooves may be formed utilizing a variety of different processes, which may be performed utilizing one or more computer numeric controlled tools or manufacturing systems. Such processes may include turning, cutting, grinding, etching, blasting, burnishing, grinding, ablation, and/or any other process capable of forming grooves in the exterior surface. In one or more implementations, the processing of the exterior surface may use a variety of different processes, which may be performed utilizing one or more computer numeric controlled tools or manufacturing systems. Such processes may include dry blasting, etching, abrasive blasting, burnishing, grinding, ablation, an/or any other process capable of reducing the sharpness or differences and/or roughening the exterior surface.

In implementations where the processing uses dry blasting, a variety of different parameters may be controlled as part of such processing. Such parameters may include adjusting the speed at which the exterior surface is moved under a blaster (e.g. the hose or other apparatus that dispenses or blasts the blast material), adjusting a distance between the exterior surface and the blaster, adjusting a rate of material blasted by the blaster, adjusting an area blasted by the blaster, and so on. The dimensions and/or spacing of the grooves may also be controlled to increase and/or decrease the amount of diffraction produced by the grooves and thus the amount processing to ameliorate such diffraction. In various implementations, such dry blasting may utilize ceramic beads as a blast material. Such ceramic beads may be zirconia-based or silicon materials that may be between 0 and 65 microns in size and/or have various other features.

Figure 1A:
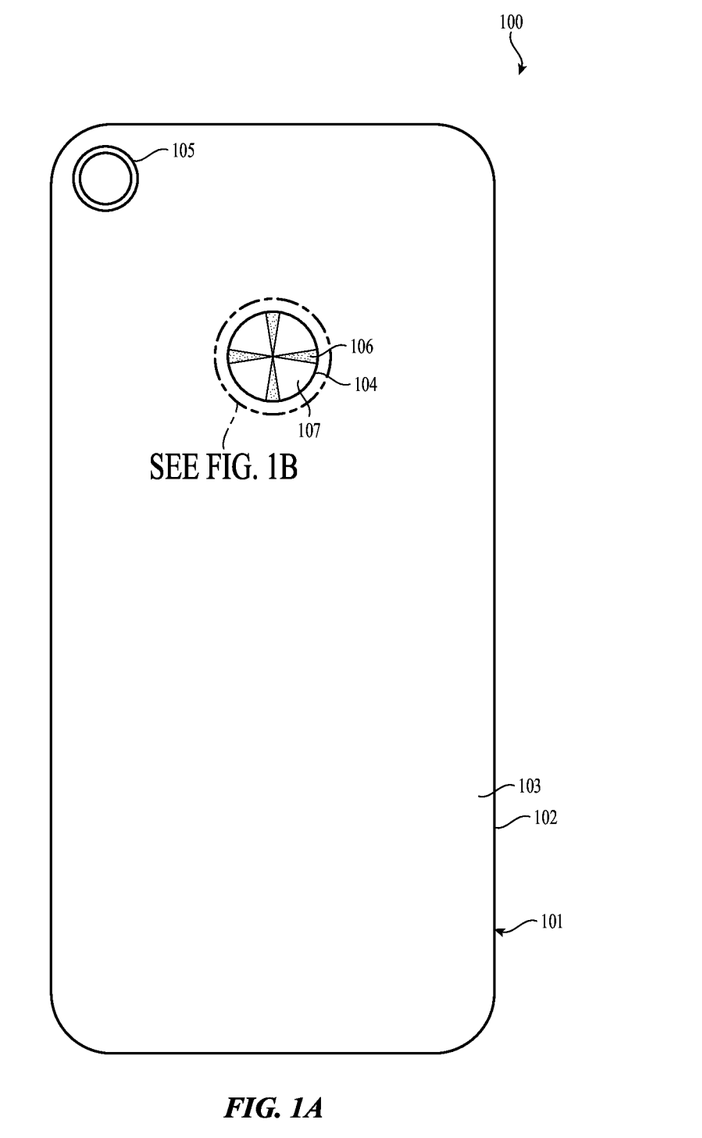
FIG. 1A is a rear plan view of an example electronic device including a component with a finished exterior surface.

FIG. 1A is a rear plan view 100 of an example electronic device 101 with a component 104 having a finished exterior surface. As illustrated, the component is a button in a back surface 103 of a housing 102 of a smart phone 101 that may be utilized to control a camera 105. However, it is understood that this is an example. In various implementations, the component may be any component with an exterior surface without departing from the scope of the present disclosure.

For example, in some implementations the component may be an aluminum housing of a laptop having a silver colored, satin finished exterior surface. A satin finish may be a finish characterized by fine lines that are uniform and directional in appearance. By way of another example, the component may be a snap or clasp on the cover for a tablet computing device. In various examples, the component may be any kind of material with a finished surface. Such materials may include metal, glass, plastic, and/or any other kind of material that can be finished.

The exterior surface of the component 104 may be finished by forming a repeating pattern of grooves thereon. Such a finish may be a satin finish and may have a variety of physical characteristics. For example, the grooves may be a series of concentric shapes such as circles. By way of another example, the grooves may be formed in a spiral and/or other curved or other line. The grooves may be proximate enough to each other that the grooves reflect white light in lighter and darker areas 106 and 107. The grooves may be proximate enough to each other (such as between approximately 0.5 microns and 70 microns apart) that the grooves, without additional processing, diffract light shone on the exterior surface and thereby cause a rainbow effect. However, the grooves may be processed to reduce the sharpness of peaks between the grooves, reduce the difference between the peaks and valleys of the grooves, and/or roughen the surface of the grooves to reduce or eliminate diffraction caused by the grooves such that light reflected from the grooves is not substantially color-shifted (e.g., is or is near the color of the reflecting surface).

Figure 1B:
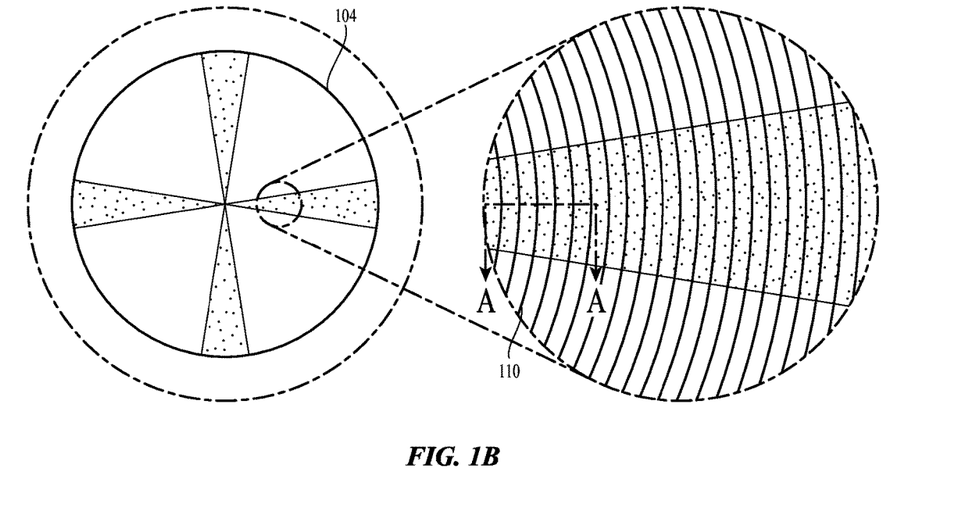
FIG. 1B is a close-up view of the component with a finished exterior surface of FIG. 1A.

FIG. 1B is a close-up view of the component 104 with a finished exterior surface of FIG. 1A. FIG. 1B also includes an expanded area of the close-up view where the grooves 110 are visible.

Figure 2A:
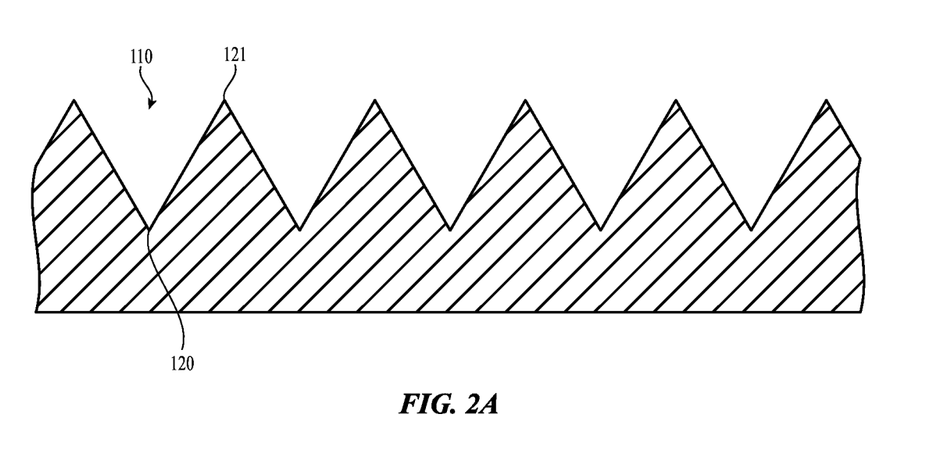
FIG. 2A is a cross-sectional view of the grooves of the exterior surface of FIG. 1B prior to processing, taken along line A-A of FIG. 1B.

FIG. 2A is a cross-sectional view of the grooves 110 of the exterior surface of FIG. 1B prior to processing, taken along line A-A of FIG. 1B. As illustrated, peaks 121 are positioned between the grooves. As also illustrated, the grooves include valleys 120.

Although a particular configuration of grooves 110 with peaks 121 and valleys 120 are illustrated, it is understood that this is an example and that other configurations are possible. For example, in various implementations the peaks may have plateau surfaces instead of pointed surfaces without departing from the scope of the present disclosure. In such implementations, reduction of the sharpness of the peaks may include reducing the sharpness of edges of the plateaus. By way of another example, the valleys may be configured to be flat or rounded as opposed to pointed without departing from the scope of the present disclosure.

Figure 2B:
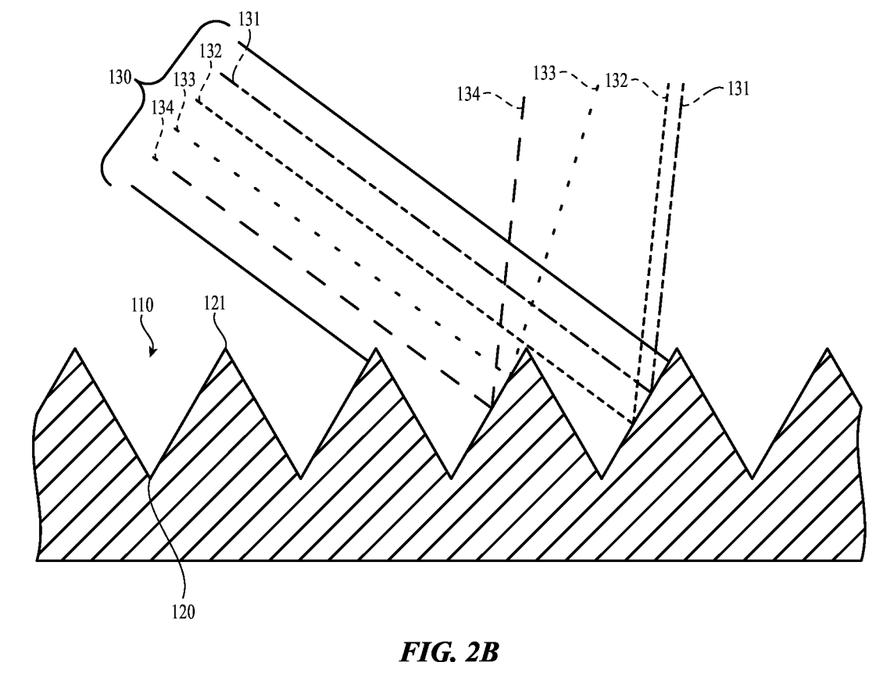
FIG. 2B illustrates the view of FIG. 2A when white light is diffracted by the grooves prior to processing.

FIG. 2B illustrates the view of FIG. 2A when white light 130 is diffracted by the grooves 110 prior to finishing. Although particular angles of reflection are shown, it is understood that this is illustrative and is not meant to be exact. As shown, the white light is made up of numerous wavelength components 131-134. Diffraction of the white light by the grooves separates the white light into the wavelength components, causing the wavelength components to be separately visible and resulting in a visual rainbow effect.

Figure 2C:
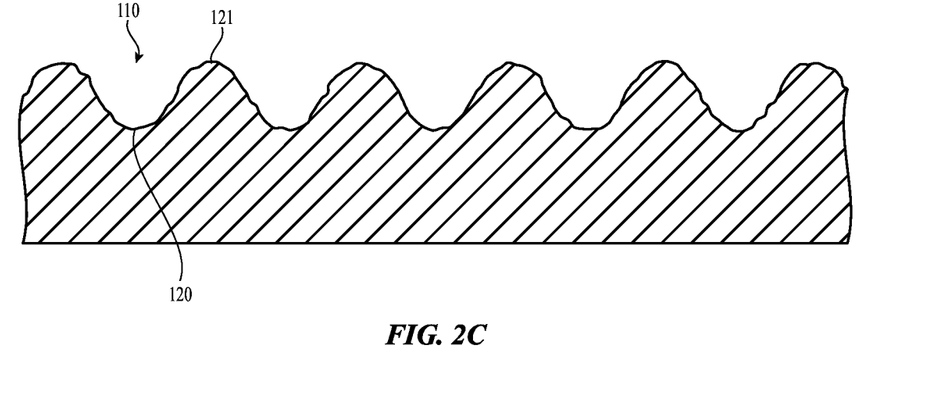
FIG. 2C illustrates the view of FIG. 2A after processing of the exterior surface.

FIG. 2C illustrates the view of FIG. 2A after processing of the exterior surface. As illustrated, the sharpness of the peaks 121 is reduced as compared to FIG. 2A. As also illustrated, the difference between the peaks and the valleys 120 is reduced. Further, the surface of the grooves 110 is roughened by pitting, scratching, and/or otherwise making the surface non- uniform. As a result of this processing, diffraction caused by the grooves may be reduced or eliminated.

The processing of the exterior surface may be accomplished utilizing a variety of different processes. Such processes may include dry blasting, etching, abrasive blasting, burnishing, grinding, ablation, and/or any other process capable of reducing the sharpness, reducing the differences, and/or roughening the surface. In various implementations, such processes may be performed utilizing one or more computer numeric controlled tools or manufacturing systems. For example, the exterior surface may be dry blasted with ceramic beads. Such ceramic beads may be formed of various materials, such as zirconia-based materials and/or silicon and like materials. Such ceramic beads may be various shapes and/or sizes, such as between 0 and 65 microns in size.

Figure 2D:
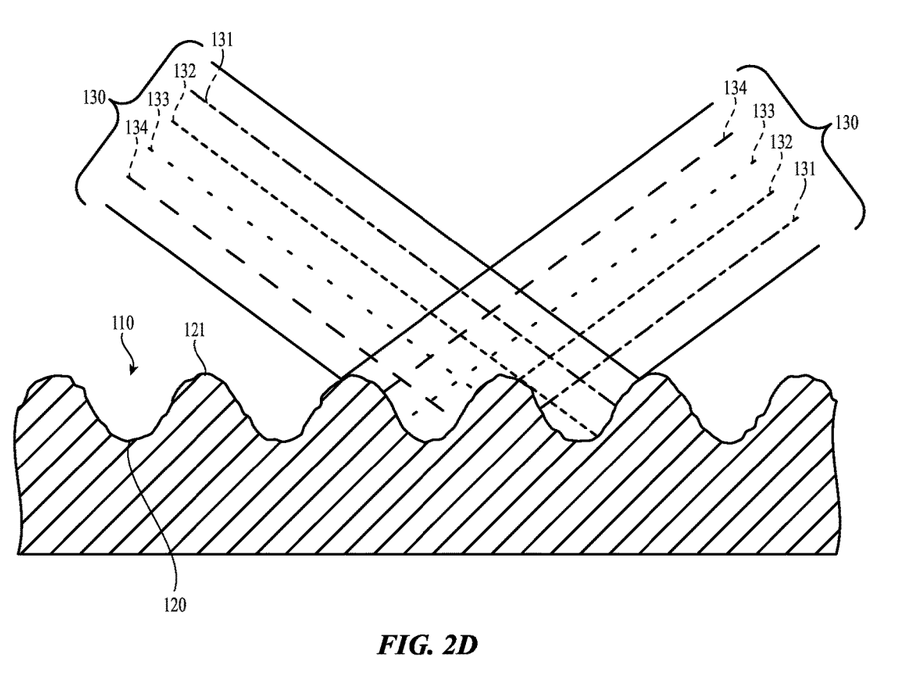
FIG. 2D illustrates an example of the view of FIG. 2A when white light is reflected in a reflection flare but not diffracted by the processed grooves.

FIG. 2D illustrates an example of the view of FIG. 2A when white light is reflected but not diffracted by the processed grooves 110. Although particular angles of reflection are shown, it is understood that this is illustrative and is not meant to be exact. As shown, the reflected white light is not separated into the wavelength components 131-134. As such, the wavelength components may not be separately visible and a visual rainbow effect may not result. Instead, light reflected from the grooves may show the color of the exterior surface.

Figure 2E:
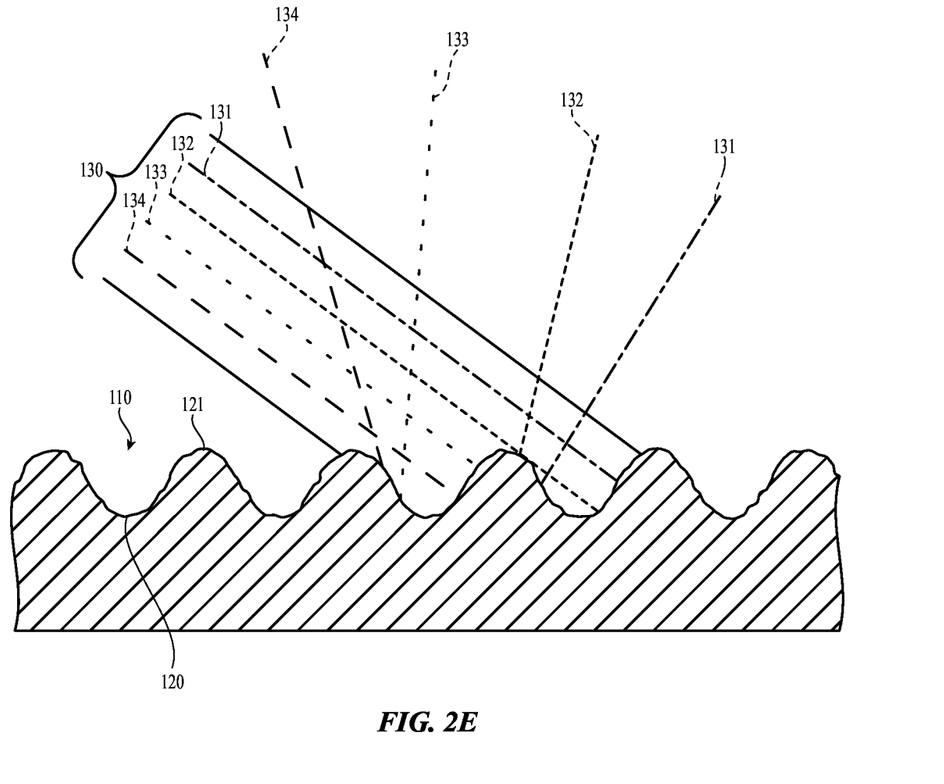
FIG. 2E illustrates an alternative example of the view of FIG. 2A when white light is diffusely as opposed to specularly diffracted by the processed grooves.

FIG. 2E illustrates an alternative example of the view of FIG. 2A when white light is diffusely as opposed to specularly diffracted by the processed grooves 110. As shown, the diffracted wavelength components 131-134 are scattered such that the separate wavelength components are not visually perceptible together to a user and the visual rainbow effect does not result. Instead, similar to the example of FIG. 2D, light reflected from the grooves may show the color of the exterior surface or substantially close thereto (e.g., white light may be reflected).

Figure 3:
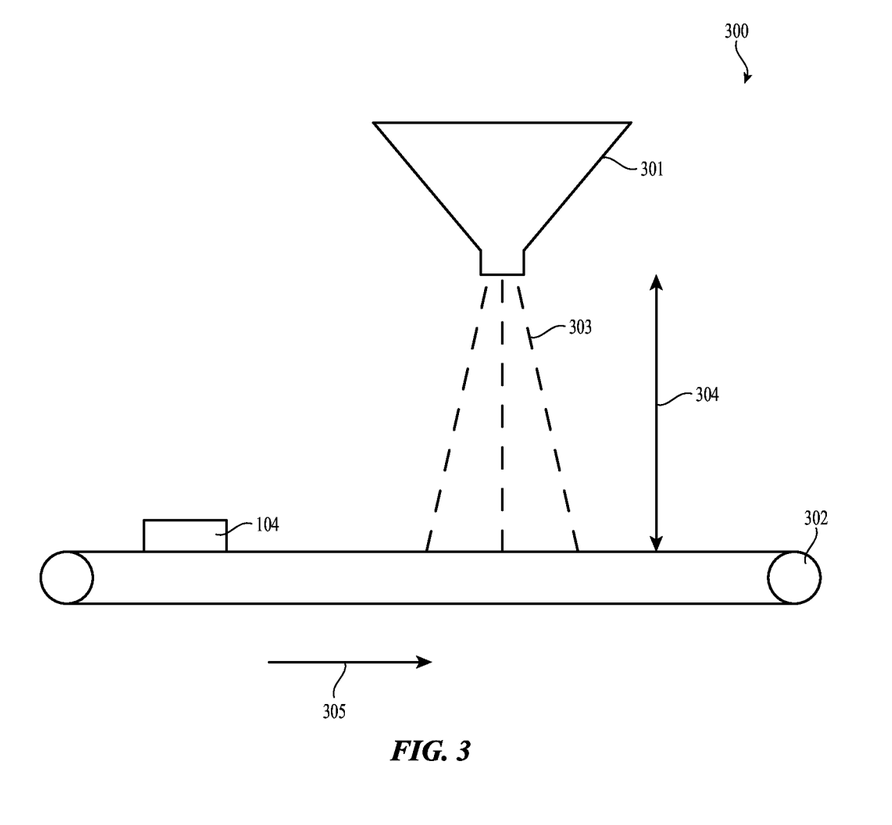
FIG. 3 is a schematic front plan view of an example system for finishing a component with an exterior surface.

FIG. 3 is a schematic front plan view of an example system 300 for finishing a component 104 with an exterior surface. As illustrated, a conveyor 302 moves a component having an exterior surface with grooves formed therein under a blaster 301 at a speed 305. The grooves may be proximate to each other such that the grooves diffract light. As also illustrated, the blaster is positioned at a height 304 above the exterior surface of the component and blasts the exterior surface of the component with blast material 303. The blasting may reduce the sharpness of the peaks between the grooves, reduce the differences between the peaks and the valleys of the grooves, and/or roughen the exterior surface to reduce or eliminate diffraction caused by the grooves.

A variety of different parameters may be controlled in the example system 300 to reduce the sharpness of the peaks between the grooves, reduce the differences between the peaks and the valleys of the grooves, and/or roughen the surface of the grooves. For example, the speed 305 at which the component 104 is moved under the blaster 301 by the conveyor 302 may be adjusted. Higher speeds (such as a conveyor speed of over one centimeter per second) may result in decreased reduction whereas lower speeds may result in increased reduction.

By way of another example, the height 304 between the exterior surface of the component 104 and the blaster 301 may be adjusted. Greater height (such as a height between the exterior surface of the component and the blaster of over 20 centimeters) may result in decreased reduction whereas smaller heights may result in increased reduction.

By way of yet another example, the rate at which the blast material 303 (such as the velocity of the blast material, the amount of blast material blasted in a period of time, and so on) is blasted by the blaster 301 may be adjusted. Higher rates may result in increased reduction whereas lower rates may result in decreased reduction.

In still another example, an area blasted by the blaster 301 may be adjusted. Greater area (such as a blast area of over 20 centimeters in diameter) may result in increased reduction whereas smaller area may result in decreased reduction.

Given a particular configuration of peaks between grooves and/or the differences between peaks and valleys of grooves, only a certain amount of material of the exterior surface may be removed in processing. For example, if the height difference between peaks and valleys is 0.5 microns, the difference between the peaks and valleys may not be reduced by more than 0.5 microns as part of such processing without destroying the grooves.

In order to accommodate such processing limits, the dimensions and/or spacing of the grooves may also be controlled as part of formation of the grooves to increase and/or decrease the amount of diffraction caused by the grooves. Control of the dimensions and/or spacing of the grooves may reduce the amount of processing that is subsequently performed to reduce or eliminate diffraction caused by the grooves.

Figure 4:
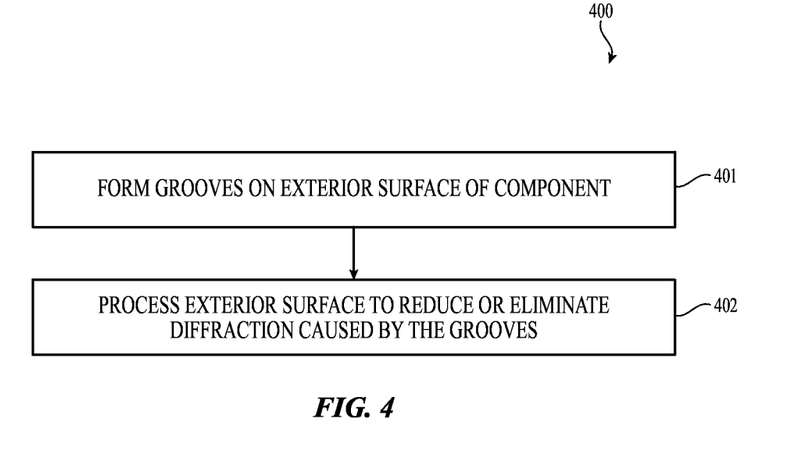
FIG. 4 is a flow chart illustrating an example method for finishing an exterior surface. This method may be performed by the system of FIG. 3 and may manufacture the components of FIGS. 1A-1B and 2C-2D.

FIG. 4 is a flow chart illustrating an example method 400 for finishing an exterior surface. This method may be performed by the system of FIG. 3 and may manufacture the components of FIGS. 1A-1B and 2C-2D.

The flow may begin at block 401 where grooves may be formed on an exterior surface of a component. The grooves may be formed proximate to each other such that the grooves diffract light. The component may be formed of a variety of different materials such as metal, plastic, glass, and so on. The grooves may be formed on the exterior surface of a component using turning, cutting, grinding, etching, blasting, burnishing, grinding, ablation, and/or any other process capable of forming grooves in the exterior surface.

The flow may then proceed to block 402 where the exterior surface may be processed to reduce or eliminate diffraction caused by the grooves. The processing may include dry blasting, etching, abrasive blasting, burnishing, grinding, ablation, an/or any other process capable of reducing the sharpness or differences. As a result of the processing, light reflected from the grooves may show the color of the exterior surface rather than a colored surface.

Although the example method 400 is illustrated and described above as including particular operations performed in a particular order, it is understood that this is an example. In various implementations, various orders of the same, similar, and/or different operations may be performed without departing from the scope of the present disclosure.

For example, block 401 describes forming grooves on an exterior surface of a component. However, in various implementations such an operation may involve forming the grooves to minimize diffraction of light by the grooves. For example, the grooves may be formed spaced sufficiently apart such that less processing may be performed in block 402 in order to reduce or eliminate diffraction of light by the processed grooves than if the grooves were formed closer together.

By way of another example, the example method 400 is illustrated and described as including block 401. However, in some implementations grooves may already be formed in an exterior surface of a component. In such an implementation, a method for finishing an exterior surface may omit block 401. Various configurations are possible and contemplated.

As discussed above and illustrated in the accompanying figures, the present disclosure details methods, systems, and apparatuses related to surface finishes. Grooves may be formed (such as by cutting utilizing a machine such as a lathe or router) on an exterior surface of a component (such as an aluminum or other metal component for an electronic device). The grooves may be formed proximate to one another such that the grooves diffract light. The exterior surface may be processed (such as by dry blasting) to reduce the sharpness of peaks between the grooves, reduce differences between the peaks and valleys of the grooves, and/or roughen the exterior surface. The processing may reduce or eliminate diffraction caused by the grooves such that light reflected from the grooves is not substantially color-shifted (e.g., is or is near the color of the reflecting surface). In this way, the exterior surface may be grooved without causing a rainbow effect.

In the present disclosure, the methods disclosed may be implemented utilizing sets of instructions or software readable by a device. Further, it is understood that the specific order or hierarchy of steps in the methods disclosed are examples of sample approaches. In other embodiments, the specific order or hierarchy of steps in the method can be rearranged while remaining within the disclosed subject matter. The accompanying method claims present elements of the various steps in a sample order, and are not necessarily meant to be limited to the specific order or hierarchy presented.

The described disclosure may utilize a computer program product, or software, that may include a non-transitory machine-readable medium having stored thereon instructions, which may be used to program a computer system (or other electronic devices) such as a computer numeric controlled manufacture system to perform a process according to the present disclosure. A non-transitory machine-readable medium includes any mechanism for storing information in a form (e.g., software, processing application) readable by a machine (e.g., a computer). The non-transitory machine-readable medium may take the form of, but is not limited to, a magnetic storage medium (e.g., floppy diskette, video cassette, and so on); optical storage medium (e.g., CD-ROM); magneto-optical storage medium; read only memory (ROM); random access memory (RAM); erasable programmable memory (e.g., EPROM and EEPROM); flash memory; and so on.

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

While the present disclosure has been described with reference to various embodiments, it will be understood that these embodiments are illustrative and that the scope of the disclosure is not limited to them. Many variations, modifications, additions, and improvements are possible. More generally, embodiments in accordance with the present disclosure have been described in the context or particular embodiments. Functionality may be separated or combined in blocks differently in various embodiments of the disclosure or described with different terminology. These and other variations, modifications, additions, and improvements may fall within the scope of the disclosure as defined in the claims that follow.

We claim:

1. A component, comprising:
an exterior metal surface comprising grooves defined in the exterior metal surface having:
an angle and spacing that is configured to diffract reflected white light into a set of visually distinct colored light components; and
a dry-media surface finish that reduces optical diffraction caused by the grooves, wherein the reduction in optical diffraction results in the reflected white light being diffracted into fewer visually distinct colored light components than the set of visually distinct colored light components.

2. The component of claim 1, wherein the white light reflected by the dry-media surface finish results in darker areas and lighter areas.

3. The component of claim 1, wherein the exterior metal surface is silver colored.

4. The component of claim 1, wherein the exterior metal surface is at least one of etched, abrasively blasted, burnished, ground, or ablated.

5. The component of claim 1, wherein the grooves are defined by at least one of turning, cutting, grinding, etching, blasting, burnishing, grinding, or ablating.

6. The component of claim 1, wherein a pattern of the grooves is curved.

7. The component of claim 1, wherein the exterior metal surface is a blasted surface.

8. A component, comprising:
an exterior metal surface defining a series of grooves having:
a spacing that is configured to diffract white light to produce a rainbow effect having a set of visually distinct color components; and
a bead-blasted surface finish that reduces the rainbow effect due to the spacing of the grooves so that reflected white light is diffracted into fewer visually distinct color components than the set of visually distinct color components.

9. The component of claim 8, wherein edges of the grooves are between 0.5 microns and 70 microns apart in the external metal surface.

10. The component of claim 8, wherein light reflected off the bead-blasted surface finish shows a color of the external metal surface.

11. The component of claim 8, wherein the grooves define a set of concentric circles.

12. The component of claim 8, wherein the grooves define a circular spiral.

13. The component of claim 8, wherein the external metal surface has a satin finish.

14. The component of claim 8, wherein the component is formed from aluminum.

15. A portable electronic device, comprising:
a component defining an exterior metal surface of the portable electronic device, the exterior metal surface comprising:
an array of grooves having a spacing that is configured to produce an optical diffraction of reflected light that separates the reflected light into multiple visually distinct light components, the array of grooves having been subjected to a surface treatment to reduce the optical diffraction so that the reflected light is diffracted into fewer visually distinct light components than the multiple visually distinct light components.

16. The portable electronic device of claim 15, wherein peaks between the array of grooves are rounded.

17. The portable electronic deviceof claim 15, wherein valleys of the grooves are rounded.

18. The portable electronic device of claim 15, wherein the component comprises a snap, a clasp, or a button.

19. The portable electronic device of claim 15, wherein the grooves are approximately 0.5 microns deep.

20. The portable electronic device of claim 15, wherein the grooves are uniformly spaced.

* * * * *